United States Patent
Levich et al.

(10) Patent No.: US 6,507,545 B2
(45) Date of Patent: Jan. 14, 2003

(54) METHOD FOR DATA READING/WRITING USING AN OPTICAL CARRIER WITH PATTERN INFORMATION PITS

(75) Inventors: Eugene Levich, New York, NY (US); Sergei Magnitskii, Moscow (RU); Nikolay Magnitskii, Moscow (RU); Andrey Mikhailov, Moscow (RU)

(73) Assignee: Tri D Store IP LLC, New York, NY (US)

( * ) Notice: Subject to any disclaimer, the term of this patent is extended or adjusted under 35 U.S.C. 154(b) by 0 days.

(21) Appl. No.: 09/780,620

(22) Filed: Feb. 12, 2001

(65) Prior Publication Data

US 2002/0105888 A1 Aug. 8, 2002

Related U.S. Application Data

(60) Provisional application No. 60/254,541, filed on Dec. 12, 2000.

(51) Int. Cl.[7] .................................................. G11B 7/00
(52) U.S. Cl. .................. 369/47.16; 369/47.1; 369/59.1; 369/275.1
(58) Field of Search .............................. 369/47.1, 47.15, 369/47.16, 47.24, 53.1, 53.44, 59.1, 59.13, 59.18, 97, 94, 44.11, 44.27, 44.34, 44.37, 275.1, 275.3

(56) References Cited

U.S. PATENT DOCUMENTS 5,802,034 A * 9/1998 Gelbart ...................... 369/97 X
5,808,986 A * 9/1998 Jewell et al. ............. 369/44.37

* cited by examiner

Primary Examiner—Muhammad Edun
(74) Attorney, Agent, or Firm—Blank Rome Comisky & McCauley LLP (57) ABSTRACT

An EET ("eight-to-ten") method has been proposed for two-dimensional spatial encoding of information stored in two- or three-dimensional, in particular fluorescent optical carriers. The method specifically ensures the same writing density as DVD carriers with EFM ("eight-fourteen modulation") modulation code but for $0.8 \times 0.4\mu$ information pit (fluorescent mark), i.e. as in CD data carriers. The larger—as compared to the DVD format—pit size enables a simpler technology for manufacturing fluorescent multilayer carriers, for instance of ROM type, and a stronger fluorescent signal in reading. The high writing density is ensured through virtually 100% filling of the information layer area with fluorescent marks in a gap-free manner. In addition, this allows application of the parallel data reading procedure and a ten-fold higher reading speed than in DVD systems. Increasing the size of the channel bit to 0.4 $\mu$m—which is 1.5 and 3 times higher than for CD and DVD formats, respectively—allows a significant reduction in the frequency band and hence in photoreceiver noises. For equal values of the reading radiation wavelength and numerical aperture of the objective lens used, the proposed ETT ("eight-to-ten") method of two-dimensional encoding in fluorescent carriers enables a significant lower magnitude of reading error probability in contrast to existing optical information carriers of DVD-type. It is also applicable to other write-once and rewritable optical data carriers based on various physical and chemical principles of forming information pits.

27 Claims, 11 Drawing Sheets

| BYTE | BINARY CODE | BYTE | BINARY CODE |
|---|---|---|---|
| 0 | 0 0 0 0 0 0 0 0 | 109 | 0 1 1 0 1 1 0 1 |
| 1 | 0 0 0 0 0 0 0 1 | 110 | 0 1 1 0 1 1 1 0 |
| 2 | 0 0 0 0 0 0 1 0 | 111 | 0 1 1 0 1 1 1 1 |
| 3 | 0 0 0 0 0 0 1 1 | 112 | 0 1 1 1 0 0 0 0 |
| 4 | 0 0 0 0 0 1 0 0 | 113 | 0 1 1 1 0 0 0 1 |
| 5 | 0 0 0 0 0 1 0 1 | 114 | 0 1 1 1 0 0 1 0 |
| 6 | 0 0 0 0 0 1 1 0 | 115 | 0 1 1 1 0 0 1 1 |
| 7 | 0 0 0 0 0 1 1 1 | 116 | 0 1 1 1 0 1 0 0 |
| 8 | 0 0 0 0 1 0 0 0 | 117 | 0 1 1 1 0 1 0 1 |
| 9 | 0 0 0 0 1 0 0 1 | 118 | 0 1 1 1 0 1 1 0 |
| 10 | 0 0 0 0 1 0 1 0 | 119 | 0 1 1 1 0 1 1 1 |
| 11 | 0 0 0 0 1 0 1 1 | 120 | 0 1 1 1 1 0 0 0 |
| 12 | 0 0 0 0 1 1 0 0 | 121 | 0 1 1 1 1 0 0 1 |
| 13 | 0 0 0 0 1 1 0 1 | 122 | 0 1 1 1 1 0 1 0 |
| 14 | 0 0 0 0 1 1 1 0 | 123 | 0 1 1 1 1 0 1 1 |
| 15 | 0 0 0 0 1 1 1 1 | 124 | 0 1 1 1 1 1 0 0 |
| 16 | 0 0 0 1 0 0 0 0 | 125 | 0 1 1 1 1 1 0 1 |
| 17 | 0 0 0 1 0 0 0 1 | 126 | 0 1 1 1 1 1 1 0 |
| 18 | 0 0 0 1 0 0 1 0 | 127 | 0 1 1 1 1 1 1 1 |
| 19 | 0 0 0 1 0 0 1 1 | 128 | 1 0 0 0 0 0 0 0 |
| 20 | 0 0 0 1 0 1 0 0 | 129 | 1 0 0 0 0 0 0 1 |
| 21 | 0 0 0 1 0 1 0 1 | 130 | 1 0 0 0 0 0 1 0 |

FIG. 3A

| BYTE | BINARY CODE | BYTE | BINARY CODE |
|---|---|---|---|
| 22 | 0 0 0 1 0 1 1 0 | 131 | 1 0 0 0 0 0 1 1 |
| 23 | 0 0 0 1 0 1 1 1 | 132 | 1 0 0 0 0 1 0 0 |
| 24 | 0 0 0 1 1 0 0 0 | 133 | 1 0 0 0 0 1 0 1 |
| 25 | 0 0 0 1 1 0 0 1 | 134 | 1 0 0 0 0 1 1 0 |
| 26 | 0 0 0 1 1 0 1 0 | 135 | 1 0 0 0 0 1 1 1 |
| 27 | 0 0 0 1 1 0 1 1 | 136 | 1 0 0 0 1 0 0 0 |
| 28 | 0 0 0 1 1 1 0 0 | 137 | 1 0 0 0 1 0 0 1 |
| 29 | 0 0 0 1 1 1 0 1 | 138 | 1 0 0 0 1 0 1 0 |
| 30 | 0 0 0 1 1 1 1 0 | 139 | 1 0 0 0 1 0 1 1 |
| 31 | 0 0 0 1 1 1 1 1 | 140 | 1 0 0 0 1 1 0 0 |
| 32 | 0 0 1 0 0 0 0 0 | 141 | 1 0 0 0 1 1 0 1 |
| 33 | 0 0 1 0 0 0 0 1 | 142 | 1 0 0 0 1 1 1 0 |
| 34 | 0 0 1 0 0 0 1 0 | 143 | 1 0 0 0 1 1 1 1 |
| 35 | 0 0 1 0 0 0 1 1 | 144 | 1 0 0 1 0 0 0 0 |
| 36 | 0 0 1 0 0 1 0 0 | 145 | 1 0 0 1 0 0 0 1 |
| 37 | 0 0 1 0 0 1 0 1 | 146 | 1 0 0 1 0 0 1 0 |
| 38 | 0 0 1 0 0 1 1 0 | 147 | 1 0 0 1 0 0 1 1 |
| 39 | 0 0 1 0 0 1 1 1 | 148 | 1 0 0 1 0 1 0 0 |
| 40 | 0 0 1 0 1 0 0 0 | 149 | 1 0 0 1 0 1 0 1 |
| 41 | 0 0 1 0 1 0 0 1 | 150 | 1 0 0 1 0 1 1 0 |
| 42 | 0 0 1 0 1 0 1 0 | 151 | 1 0 0 1 0 1 1 1 |
| 43 | 0 0 1 0 1 0 1 1 | 152 | 1 0 0 1 1 0 0 0 |
| 44 | 0 0 1 0 1 1 0 0 | 153 | 1 0 0 1 1 0 0 1 |
| 45 | 0 0 1 0 1 1 0 1 | 154 | 1 0 0 1 1 0 1 0 |

FIG. 3B

| BYTE | BINARY CODE | IMAGE | BYTE | BINARY CODE | IMAGE |
|---|---|---|---|---|---|
| 46 | 0 0 1 0 1 1 1 0 |  | 155 | 1 0 0 1 1 0 1 1 |  |
| 47 | 0 0 1 0 1 1 1 1 |  | 156 | 1 0 0 1 1 1 0 0 |  |
| 48 | 0 0 1 1 0 0 0 0 |  | 157 | 1 0 0 1 1 1 0 1 |  |
| 49 | 0 0 1 1 0 0 0 1 |  | 158 | 1 0 0 1 1 1 1 0 |  |
| 50 | 0 0 1 1 0 0 1 0 |  | 159 | 1 0 0 1 1 1 1 1 |  |
| 51 | 0 0 1 1 0 0 1 1 |  | 160 | 1 0 1 0 0 0 0 0 |  |
| 52 | 0 0 1 1 0 1 0 0 |  | 161 | 1 0 1 0 0 0 0 1 |  |
| 53 | 0 0 1 1 0 1 0 1 |  | 162 | 1 0 1 0 0 0 1 0 |  |
| 54 | 0 0 1 1 0 1 1 0 |  | 163 | 1 0 1 0 0 0 1 1 |  |
| 55 | 0 0 1 1 0 1 1 1 |  | 164 | 1 0 1 0 0 1 0 0 |  |
| 56 | 0 0 1 1 1 0 0 0 |  | 165 | 1 0 1 0 0 1 0 1 |  |
| 57 | 0 0 1 1 1 0 0 1 |  | 166 | 1 0 1 0 0 1 1 0 |  |
| 58 | 0 0 1 1 1 0 1 0 |  | 167 | 1 0 1 0 0 1 1 1 |  |
| 59 | 0 0 1 1 1 0 1 1 |  | 168 | 1 0 1 0 1 0 0 0 |  |
| 60 | 0 0 1 1 1 1 0 0 |  | 169 | 1 0 1 0 1 0 0 1 |  |
| 61 | 0 0 1 1 1 1 0 1 |  | 170 | 1 0 1 0 1 0 1 0 |  |
| 62 | 0 0 1 1 1 1 1 0 |  | 171 | 1 0 1 0 1 0 1 1 |  |
| 63 | 0 0 1 1 1 1 1 1 |  | 172 | 1 0 1 0 1 1 0 0 |  |
| 64 | 0 0 0 0 0 0 0 0 |  | 173 | 1 0 1 0 1 1 0 1 |  |
| 65 | 0 0 0 0 0 0 0 0 |  | 174 | 1 0 1 0 1 1 1 0 |  |
| 66 | 0 0 0 0 0 0 0 0 |  | 175 | 1 0 1 0 1 1 1 1 |  |
| 67 | 0 0 0 0 0 0 0 0 |  | 176 | 1 0 1 1 0 0 0 0 |  |
| 68 | 0 0 0 0 0 0 0 0 |  | 177 | 1 0 1 1 0 0 0 1 |  |
| 69 | 0 0 0 0 0 0 0 0 |  | 178 | 1 0 1 1 0 0 1 0 |  |

FIG. 3C

| BYTE | BINARY CODE | IMAGE | BYTE | BINARY CODE | IMAGE |
|---|---|---|---|---|---|
| 70 | 0 1 0 0 0 1 1 0 |  | 179 | 1 0 1 1 0 0 1 1 |  |
| 71 | 0 1 0 0 0 1 1 1 |  | 180 | 1 0 1 1 0 1 0 0 |  |
| 72 | 0 1 0 0 1 0 0 0 |  | 181 | 1 0 1 1 0 1 0 1 |  |
| 73 | 0 1 0 0 1 0 0 1 |  | 182 | 1 0 1 1 0 1 1 0 |  |
| 74 | 0 1 0 0 1 0 1 0 |  | 183 | 1 0 1 1 0 1 1 1 |  |
| 75 | 0 1 0 0 1 0 1 1 |  | 184 | 1 0 1 1 1 0 0 0 |  |
| 76 | 0 0 0 0 0 0 0 0 |  | 185 | 1 0 1 1 1 0 0 1 |  |
| 77 | 0 0 0 0 0 0 0 0 |  | 186 | 1 0 1 1 1 0 1 0 |  |
| 78 | 0 0 0 0 0 0 0 0 |  | 187 | 1 0 1 1 1 0 1 1 |  |
| 79 | 0 0 0 0 0 0 0 0 |  | 188 | 1 0 1 1 1 1 0 0 |  |
| 80 | 0 1 0 1 0 0 0 0 |  | 189 | 1 0 1 1 1 1 0 1 |  |
| 81 | 0 1 0 1 0 0 0 1 |  | 190 | 1 0 1 1 1 1 1 0 |  |
| 82 | 0 1 0 1 0 0 1 0 |  | 191 | 1 0 1 1 1 1 1 1 |  |
| 83 | 0 1 0 1 0 0 1 1 |  | 192 | 1 1 0 0 0 0 0 0 |  |
| 84 | 0 1 0 1 0 1 0 0 |  | 193 | 1 1 0 0 0 0 0 1 |  |
| 85 | 0 1 0 1 0 1 0 1 |  | 194 | 1 1 0 0 0 0 1 0 |  |
| 86 | 0 1 0 1 0 1 1 0 |  | 195 | 1 1 0 0 0 0 1 1 |  |
| 87 | 0 1 0 1 0 1 1 1 |  | 196 | 1 1 0 0 0 1 0 0 |  |
| 88 | 0 1 0 1 1 0 0 0 |  | 197 | 1 1 0 0 0 1 0 1 |  |
| 89 | 0 1 0 1 1 0 0 1 |  | 198 | 1 1 0 0 0 1 1 0 |  |
| 90 | 0 1 0 1 1 0 1 0 |  | 199 | 1 1 0 0 0 1 1 1 |  |
| 91 | 0 1 0 1 1 0 1 1 |  | 200 | 1 1 0 0 1 0 0 0 |  |
| 92 | 0 1 0 1 1 1 0 0 |  | 201 | 1 1 0 0 1 0 0 1 |  |
| 93 | 0 1 0 1 1 1 0 1 |  | 202 | 1 1 0 0 1 0 1 0 |  |

FIG. 3D

| BYTE | BINARY CODE | IMAGE | BYTE | BINARY CODE | IMAGE |
|---|---|---|---|---|---|
| 94 | 0 1 0 1 1 1 1 0 | | 203 | 1 1 0 0 1 0 1 1 | |
| 95 | 0 1 0 1 1 1 1 1 | | 204 | 1 1 0 0 1 1 0 0 | |
| 96 | 0 1 1 0 0 0 0 0 | | 205 | 1 1 0 0 1 1 0 1 | |
| 97 | 0 1 1 0 0 0 0 1 | | 206 | 1 1 0 0 1 1 1 0 | |
| 98 | 0 1 1 0 0 0 1 0 | | 207 | 1 1 0 0 1 1 1 1 | |
| 99 | 0 1 1 0 0 0 1 1 | | 208 | 1 1 0 1 0 0 0 0 | |
| 100 | 0 1 1 0 0 1 0 0 | | 209 | 1 1 0 1 0 0 0 1 | |
| 101 | 0 1 1 0 0 1 0 1 | | 210 | 1 1 0 1 0 0 1 0 | |
| 102 | 0 1 1 0 0 1 1 0 | | 211 | 1 1 0 1 0 0 1 1 | |
| 103 | 0 1 1 0 0 1 1 1 | | 212 | 1 1 0 1 0 1 0 0 | |
| 104 | 0 1 1 0 1 0 0 0 | | 213 | 1 1 0 1 0 1 0 1 | |
| 105 | 0 1 1 0 1 0 0 1 | | 214 | 1 1 0 1 0 1 1 0 | |
| 106 | 0 1 1 0 1 0 1 0 | | 215 | 1 1 0 1 0 1 1 1 | |
| 107 | 0 1 1 0 1 0 1 1 | | 216 | 1 1 0 1 1 0 0 0 | |
| 108 | 0 1 1 0 1 1 0 0 | | 217 | 1 1 0 1 1 0 0 1 | |

| BYTE | BINARY CODE | IMAGE | IMAGE |
|---|---|---|---|
| 218 | 1 1 0 1 1 0 1 0 | | |
| 219 | 1 1 0 1 1 0 1 1 | | |
| 220 | 1 1 0 1 1 1 0 0 | | |
| 221 | 1 1 0 1 1 1 0 1 | | |
| 222 | 1 1 0 1 1 1 1 0 | | |
| 223 | 1 1 0 1 1 1 1 1 | | |
| 224 | 1 1 1 0 0 0 0 0 | | |
| 225 | 1 1 1 0 0 0 0 1 | | |
| 226 | 1 1 1 0 0 0 1 0 | | |

FIG. 3E

| BYTE | BINARY CODE | IMAGE | IMAGE |
|---|---|---|---|
| 227 | 1 1 1 0 0 0 1 1 | | |
| 228 | 1 1 1 0 0 1 0 0 | | |
| 229 | 1 1 1 0 0 1 0 1 | | |
| 230 | 1 1 1 0 0 1 1 0 | | |
| 231 | 1 1 1 0 0 1 1 1 | | |
| 232 | 1 1 1 0 1 0 0 0 | | |
| 233 | 1 1 1 0 1 0 0 1 | | |
| 234 | 1 1 1 0 1 0 1 0 | | |
| 235 | 1 1 1 0 1 0 1 1 | | |
| 236 | 1 1 1 0 1 1 0 0 | | |
| 237 | 1 1 1 0 1 1 0 1 | | |
| 238 | 1 1 1 0 1 1 1 0 | | |
| 239 | 1 1 1 0 1 1 1 1 | | |
| 240 | 1 1 1 1 0 0 0 0 | | |
| 241 | 1 1 1 1 0 0 0 1 | | |
| 242 | 1 1 1 1 0 0 1 0 | | |
| 243 | 1 1 1 1 0 0 1 1 | | |
| 244 | 1 1 1 1 0 1 0 0 | | |
| 245 | 1 1 1 1 0 1 0 1 | | |
| 246 | 1 1 1 1 0 1 1 0 | | |
| 247 | 1 1 1 1 0 1 1 1 | | |
| 248 | 1 1 1 1 1 0 0 0 | | |
| 249 | 1 1 1 1 1 0 0 1 | | |
| 250 | 1 1 1 1 1 0 1 0 | | |

METHOD FOR DATA READING/WRITING USING AN OPTICAL CARRIER WITH PATTERN INFORMATION PITS

This application claims the benefit of Provisional application Ser. No. 60/254,541, filed Dec. 12, 2000.

BACKGROUND OF THE INVENTION

1. Field of the Invention.

The invention relates to optical memory systems and more particularly to methods of 2D spatial encoding of information for high-density writing in one- or multilayer optical, especially fluorescent data storage systems.

2. Description of the Prior Art.

The available optical memory systems utilize 2D carriers, generally with one or two information layers. Most of the prior art in the field of optical information recording are based on generating changes in the intensity of reflected laser radiation in local microregions (pits) of the information layer. These changes contain stored information and can result from interference effects on a microrelief surface of optical discs of a CD- Read-Only-Memory (ROM)-type, burning of holes in the metal film, dye bleaching, local melting of dye-containing polymers in widely used CD-Write-Once-Read-Many (WORM) systems, change in reflection coefficient in phase-change CD-Rewritable (RW) systems, etc.

Figure 1:
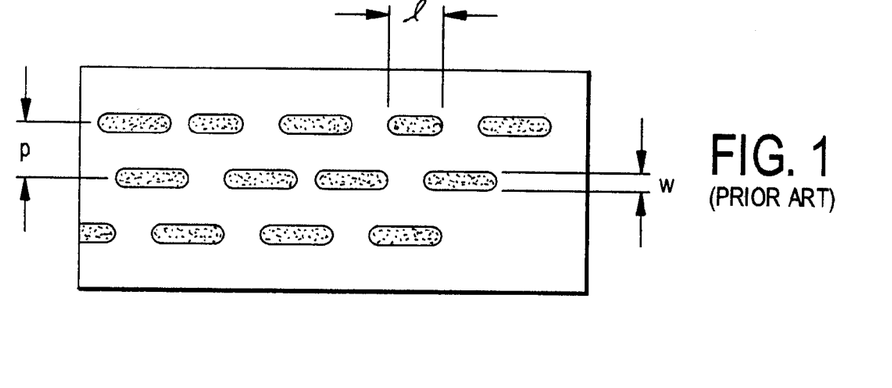
FIG. 1 schematically illustrates the geometry of two-dimensional spatial distribution of information pits on the surface of a CD or DVD optical information carrier.

FIG. 1 schematically presents geometry of two-dimensional spatial distribution of information pits on the surface of CD and DVD optical information carriers. Their spatial distribution in CD- and DVD-ROM can be characterized by such parameters as typical pit sizes (shortest pit length l, width w, depth d, and track pitch p) and channel bit length.

Numerical values of these and other CD- and DVD-ROM parameters are given in Table 1. ["Information Storage Materials ", pp. 36, 42].

TABLE 1

From CD to DVD

| Parameter | CD | DVD |
| --- | --- | --- |
| Wavelength λ, nm | 780 | 650 |
| Numerical aperture NA | 0.45 | 0.60 |
| Shortest pit length, nm | 831 | 399 |
| Depth, μm | 0.13–0.15 | 0.11–0.12 |
| Track pitch, μm | 1.6 | 0.74 |
| Channel bit length, nm | 277 | 133 |
| Modulation code* | EFM | EFM** |
| Physical bit density, Mbit/cm$^2$ | 106 | 508 |
| Reference velocity CLV, m/s | 1.2 | 4.0 |
| Spot size λ/2NA, μm | 0.9 | 0.55 |
| Capacity, GB | 0.65 | 4.7 |

*For EFM ("eight-fourteen modulation") one has 17 channel bits (14 modulation and 3 merging bits) for 8 data bits. Each channel bit corresponds to 1/3 of the minimum mark length. The physical bit density equals to 1/(track pitch × channel bit length × 17/8). For EFM** the factor 17/8 is replaced by 16/8.

As can be seen from Table 1, transfer to the DVD-format considerably increases the density and consequently the volume of stored information. However, as can be seen from FIG. 1 and Table 1, information pits occupy yet only part of the information layer area which significantly reduces the values of density and volume of stored information as compared to maximum permissible magnitudes.

To increase the writing density such methods are used as transfer to shorter-wavelength radiation sources in combination with high-NA objective lens (see Table 1 and as an example [I. Ichimura et al, SPIE, 3864, 228]), a reduced track pitch and increasing the groove depth of the land groove recording type optical disk [S. Morita et al, SPIE, 3109, 167]. For high-density data storage, new media and techniques for data reading therefrom [T. Vo-Diny et al, SPIE, 3401, 284], pit-depth modulation [S. Spielman et al, SPIE, 3109, 98], and optical discs having square information pits arranged in symmetrical patterns [Satoh et al, U.S. Pat. No 5,572,508].

Data writing density as high as more than several terabits per cubic centimeter can be ensured by three-dimensional (monolithic) photosensitive media exhibiting various photophysical or photochemical non-linear effects at two-photon absorption. The best reading/writing mode for such 3D WORM or WER information carriers is cooperative two-photon absorption by photosensitive components and photoreaction products themselves via an intermediate virtual level as in the case of photochromic [D. Parthenopoulos et al, Science, 245, (1989), 843] or photobleacing [P. Cheng et al, Scanning, 18, (1996), 129] materials or registration of a change in refractive index as in the case of photorefractive crystals [Y. Kawata et al, Opt. Lett., 23, (1998), 756] or polymers [D. Day et al, SPIE, 3864, 103] and photopolymers [R. Borisov et al, Appl. Phys., B 67, (1998), 1].

Generally, such reading/writing mode allows local recording of data as marks (pits) analogous to information pits in conventional CD- or DVD-ROM, with varied optical properties in the volume of information medium.

Practical realization of this principle however is impeded by the large overall size needed for such writing of femtosecond laser radiation sources and the extremely low photosensitivity of the media themselves. The latter is dictated predominantly by the low magnitudes of cross sections of two-photon absorption currently known.

That same reason rules out the application of 1–10-mW small-size semiconductor lasers for two-photon data writing. Besides, the design of the 3D system based on this principle is rather complicated.

To increase the volume of information stored the application of multilayer bilateral information carriers would be technically more justifiable. However, they impose certain restrictions on the design and properties of the recording medium, data reading and writing procedures, especially in the depth, thereby creating additional difficulties.

In the reflection mode operation, each information layer of the multilayer optical data carrier must have a partially reflecting coat. This attenuates the intensity of both reading and reflecting, information-carrying, beams as a result of direct and reverse motion through the carrier up to a specified information carrying layer and back to the photoreceiver. In addition, as both beams are coherent, they are prone to difficult-to-read diffraction and interference distortions on pits and grooves of the information carrying layers occurring on their way.

In this case, preference should be given to multilayer optical information carriers with fluorescent reading that need no partially reflecting coats. Said information carriers ensure considerably reduced diffraction and interference distortions due to the noncoherence of fluorescent radiation, longer wavelength thereof in contrast to reading laser radiation as well as transparence and homogeneity (identity of refraction indices for some layers) of the optical medium with respect to the incident laser and fluorescent radiations. Consequently, multilayer fluorescent optical information carriers have advantages over reflecting ones. In addition, fluorescent reading enables a higher signal-to-noise ratio as compared to the absorption method.

Currently the general demand to all types, in particular fluorescent, of multilayer information carriers as optical discs and cards, tapes or cylinders is that they must ensure maximum possible volume and density of recorded information and maximum possible data reading rate. These requirements are met by minimizing the size of information pits and increasing the recording density thereof in each separate information layer while increasing the total number of layers, as well as by switching over to shorter-wavelength optical radiators as the information density storable in N-dimensional memory systems (N=1, 2, 3) is inversely proportional to the wavelength to the power N. However reducing the size of information pits and accordingly increasing the writing density thereof may lead to a lower intensity of the reading information signal and higher crosstalks due to the "excitation" of the adjacent information layers the reading radiation is passing through. As a result, the reading signal-to-noise ratio goes down.

The purpose of the present invention is to eliminate the above drawbacks through application of a new method of spatial encoding in information layers and parallel data reading therefrom.

SUMMARY OF THE INVENTION

The subject of the present invention is a new ETT ("eight-to-ten") method of two-dimensional spatial encoding of information stored in two- or three-dimensional, in particular fluorescent optical carriers. The method specifically ensures the same writing density as DVD carriers with EFM ("eight-fourteen modulation") modulation code (see Table 1) but for a 0.8×0.4 μm information pit (fluorescent mark), i.e. as in CD data carriers. The larger—as compared to the DVD format—pit size enables a simpler technology for manufacturing fluorescent multilayer carriers, for instance of ROM type, and a stronger fluorescent signal in reading. The high writing density is ensured through virtually 100% filling of the information layer area with fluorescent marks in a gap-free manner. The proposed method allows application of the parallel data reading procedure and a ten-fold higher reading speed than in DVD systems. Increasing the size of the channel bit to 0.4 μm—which is 1.5 and 3 times higher than for CD and DVD formats, respectively—allows a significant reduction in the frequency band and hence in photoreceiver noises.

For equal values of the reading radiation wavelength and numerical aperture of the objective lens used, the proposed ETT method of two-dimensional encoding in fluorescent carriers enables a significantly lower magnitude of reading error probability in contrast to existing optical information carriers of DVD-type.

The proposed method is also applicable to other one- and multilayer optical data carriers based on various physical and chemical principles of forming information pits, such as photorefractive crystals and polymers, photopolymers, magnetooptical, phase-change, persistent spectral-hole-burning recording systems, as well as to other one- and multilayer optical data carriers of ROM-, WORM- and WER- type.

Said method is applicable to various forms of optical memory, for example, as an optical disc, optical memory card, optical memory tape or drum (cylinder), etc.

The subject of the invention is writing of one information byte in a field (microregion) consisting of ten (2×5) square elements ("(2×5)-field") of specific size in which each said square element contains or does not contain any changes (different from those layer regions that do not carry information) in optical properties (absorption and reflection factors, refraction index, birefringence factor, etc.) testifying either presence or absence of an information pit therein. One information byte has an area of 10S, where S=a×a is the area of one square element and a is the square side. Adjacent bytes are positioned on the plane close to each other without gaps.

Another subject of the invention is a representation of all 256 combinations composing an information byte on the information layer plane by "(2×5)-fields" of two types wherein the first 222 combinations are represented by fields in which each information-carrying square element (pit) has inside a "(2×5)-field" at least one identical adjacent element positioned transversely or lengthwise while each square element comprising no information pit has inside the field identical adjacent element (parity condition).

With appropriate modification, the method can be also utilized for three-dimensional volumetric data encoding as volumetric bytes recorded within a specified microvolume using the two-photon procedure, each said byte consisting of N number of cubic elements of certain size. Data can be read by either one- or two-photon procedure.

A further subject of the invention is the use for writing C&D information of the remaining 52 combinations each represented by one of two complementary "(2×5)-fields", wherein the parity condition can be violated only for the top left or bottom left square element of the field consisting of (2×5) square elements.

The subject of this invention is the selection while writing from the pair of "(2×5)-fields' of such a "(2×5)-field" that when joined to the left field thereof enables meeting the parity condition inside each lengthwise strip consisting of joined to one another fields (bytes). In this case, the minimal regions of the information layer containing any changes (distinct from the layer regions containing no information) in optical (for example, fluorescent) properties, are composed of two adjacent square elements with varied optical (for example, fluorescent) properties (i.e. information pits (or fluorescent marks)) and consequently measure a×2a. The layer's minimal regions free of information pits have the same size.

One more subject of the present invention is a possibility of gap-free filling of virtually entire area of the data-carrying layer with the proposed ETT-coded information pits.

Further, the invention concerns parallel data reading from an optical carrier with the ETT code by means of one- or two-dimensional photodetector array, for instance CCD cameras, enabling mutual longitudinal (and transverse, if necessary) motion relative to each other at a rate timed with both the size of the channel bit and the frame operating rate of the photodetector (CCD camera) array. In so doing, the adjacent element pairs in each transverse column belonging to different "(2×5)-fields" are identified simultaneously. Both elements are considered information-carrying pits when the signals arrived from individual photodetectors "covering" respective square elements of the information layer exceed some level $L_1$ and are not considered such when both signals do not exceed some level $L_2<L_1$. When the above-mentioned terms are not met, the square element with a higher signal level is identified as an information pit, while the other element, accordingly, is not considered an information pit. The $L_1$ and $L_2$ magnitudes are preset by the technical parameters of both the information-carrying medium and the optical reading device.

Another subject of the invention is an optical memory system of ROM type based on a multilayer fluorescent optical card and parallel data reader switching on reading radiation with a wavelength such that it excites fluorescence of the information pits, a dichroic mirror transmitting reading and reflecting fluorescent (information-carrying) radiation, an optical system shaping requisite spatial configuration of the reading beam in the location of a given information layer and fluorescent image thereof in the plane of the linear photodetector array (the linear array of 10 CCD cameras).

The optical card has 10 information layers of size 10 cm×10 cm, each of approximately 6 GB in capacity (or 60 GB in a card). Each layer consists of 250 information strips 400 μm wide and is provided with C&D (<<control and display>>) information tracks allowing timing and autotracking of the linear CCD array as it moves across and along the optical card. Each of the CCD cameras has 1000×1000 pixels of size 8 μm and is capable of comparing a signal from each pixel with two levels, and signals from adjacent pixels between themselves. When the linear CCD array operates in the data pit-to-CCD pixel mode (at 20-fold magnification of the camera) at the rate of 30 frames per second, the whole linear array can read information at $3 \cdot 10^8$ pit/s, which in compliance with the ETT-code makes $30 \cdot 10^6$ B/s or approximately 220 Mb/s. In this case the rate of the linear CCD array is about 12 mm/s, which is almost 100 times slower than one-time data reading from a CD ROM optical disc.

The attached figures and examples illustrating the proposed invention will make its specific features and advantages more demonstrative.

DETAILED DESCRIPTION OF THE PREFERRED EMBODIMENTS

Figure 2:
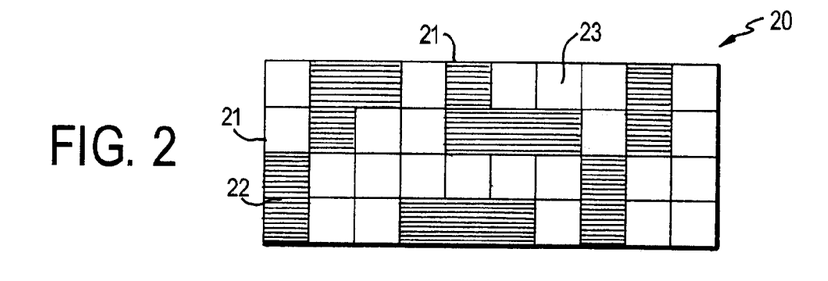
FIG. 2 schematically illustrates the geometric configuration of four adjacent information bytes recorded by means of a fluorescent substance using the ETT code.
Figure 3A:
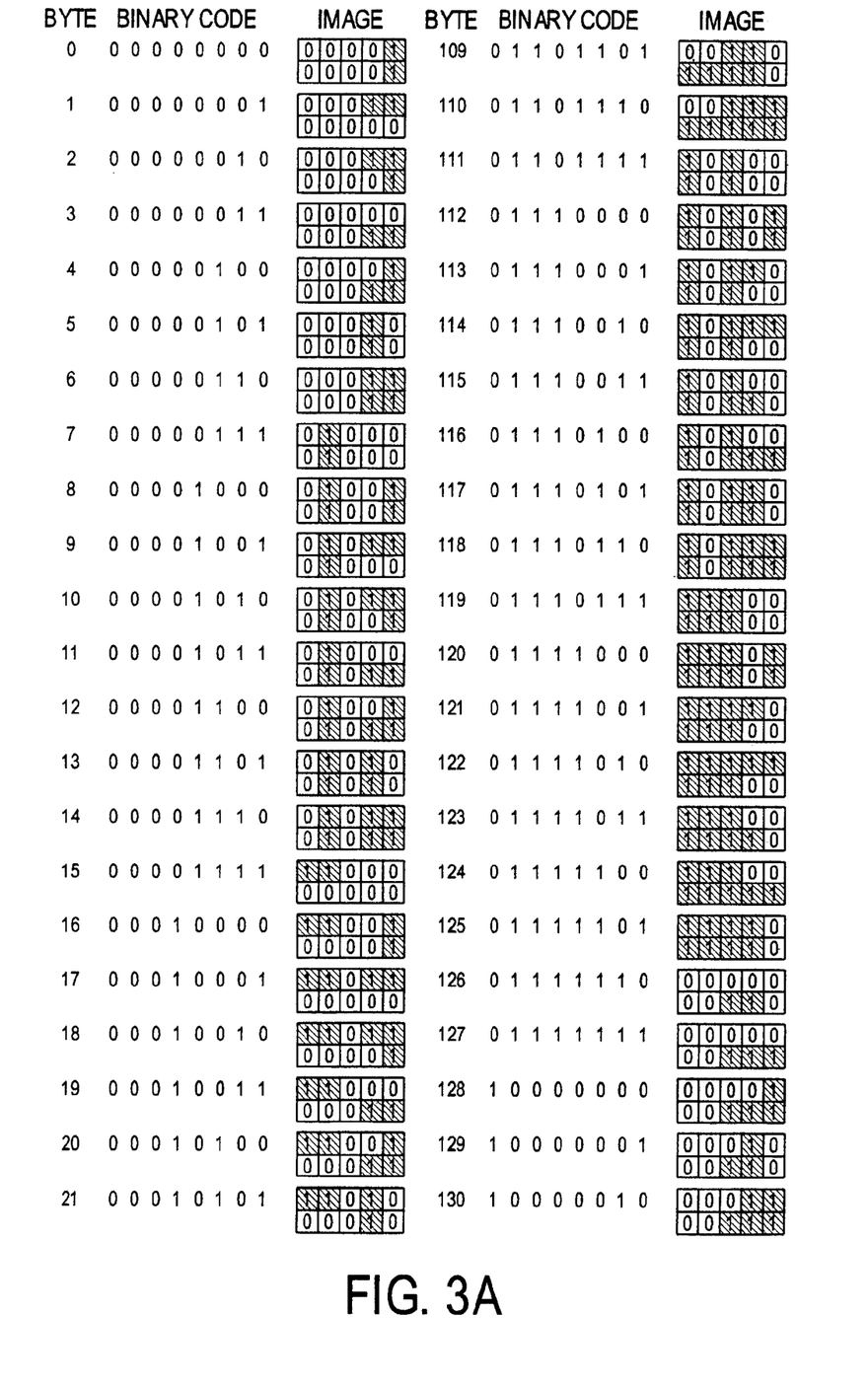
FIG. 3 is a binary-ETT code conversion table.
Figure 3B:
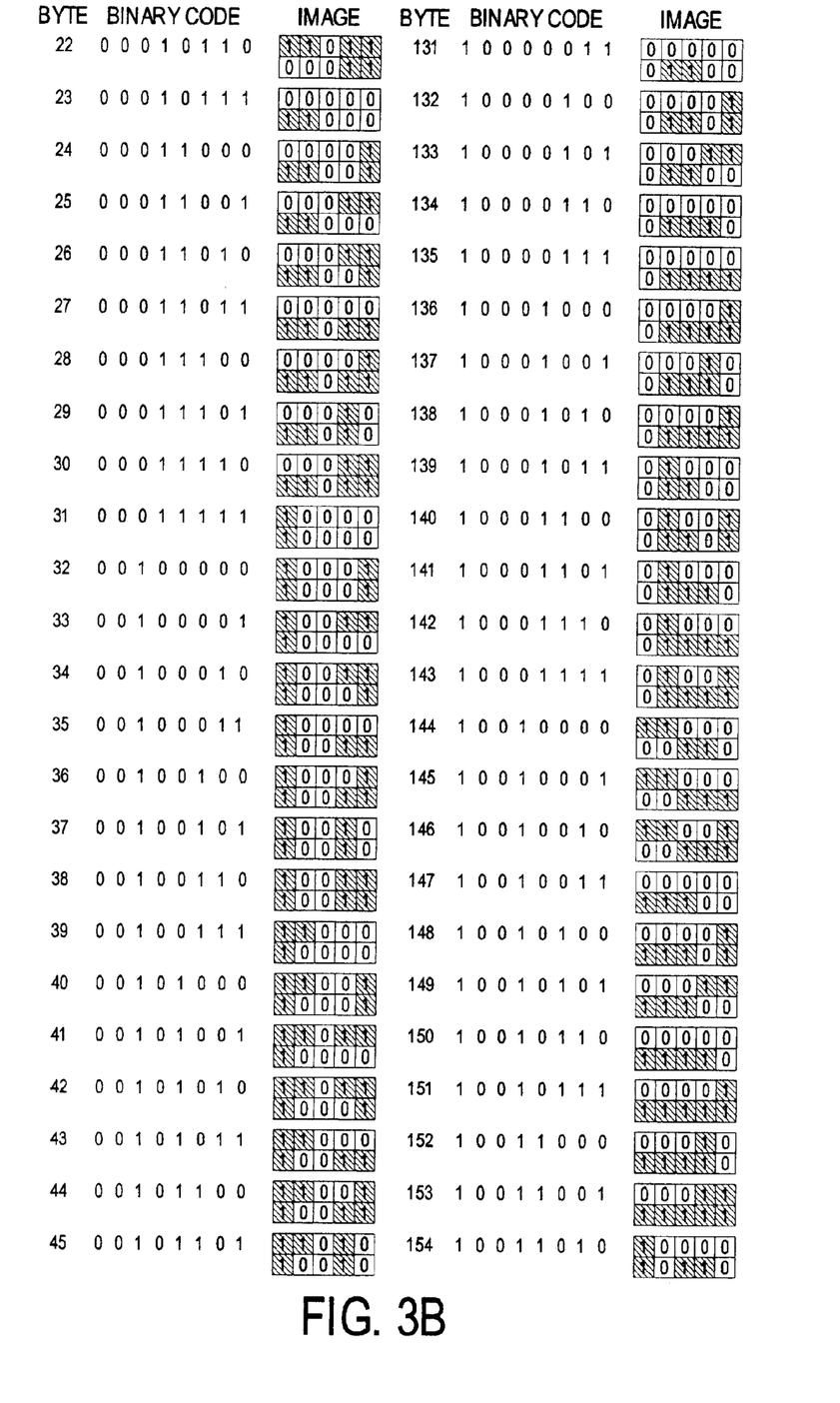
Figure 3C:
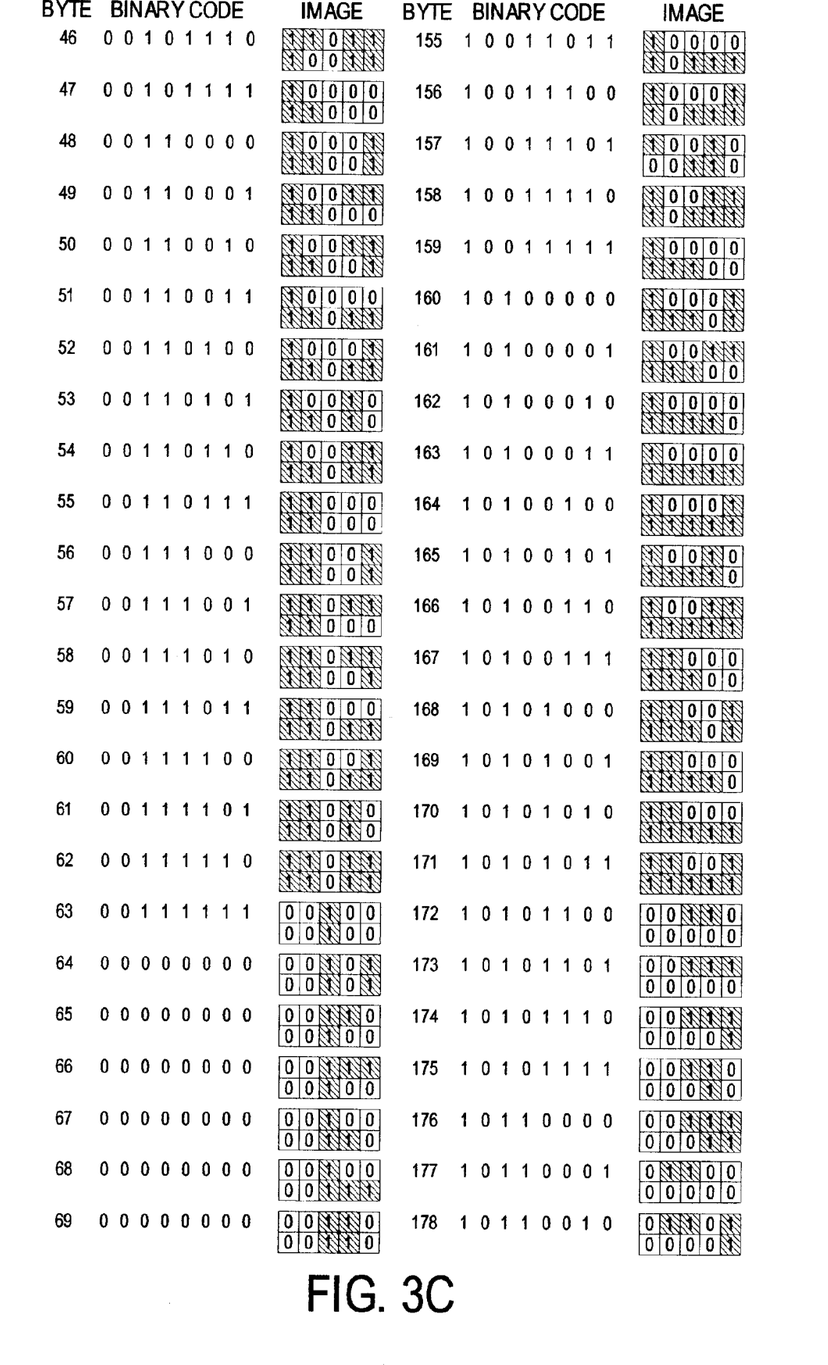
Figure 3D:
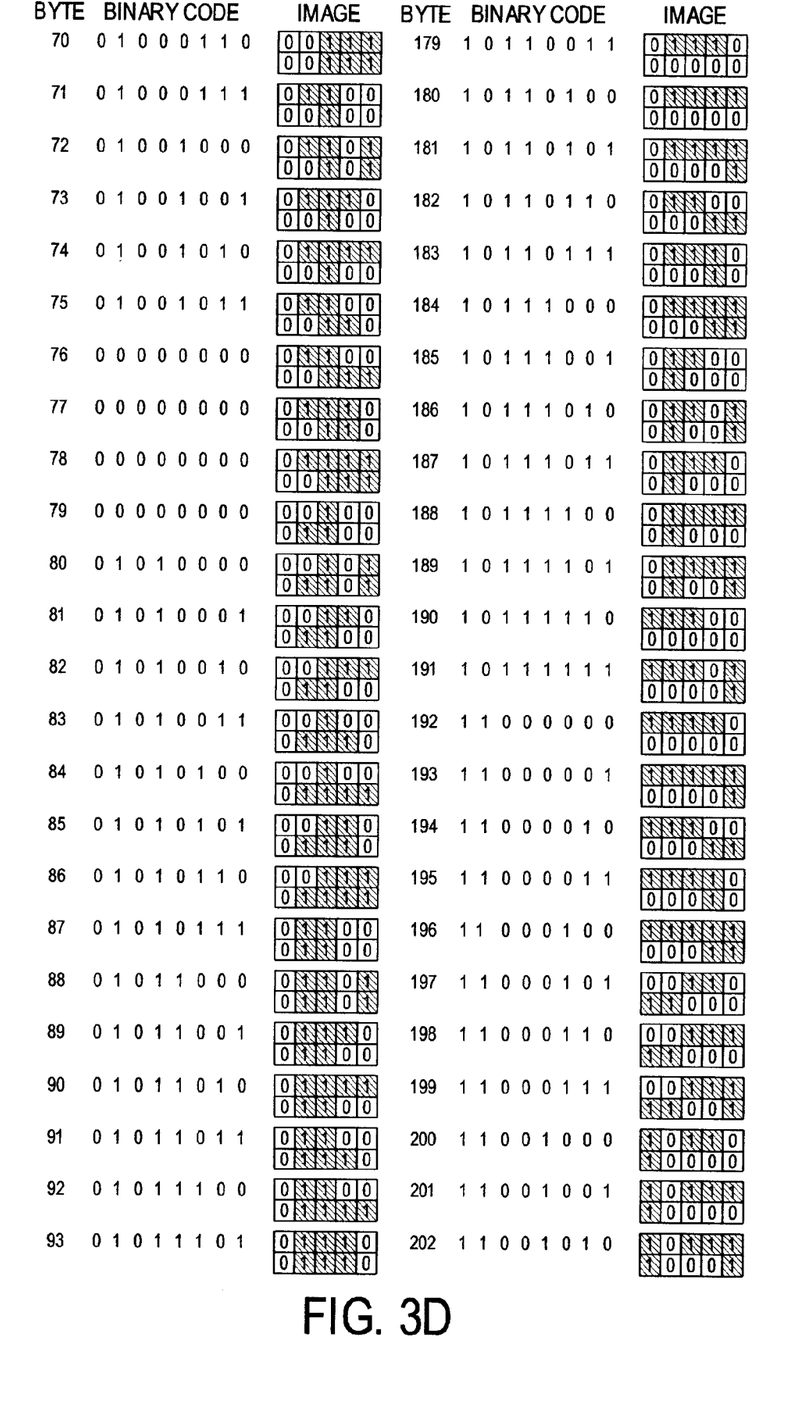
Figure 3E:
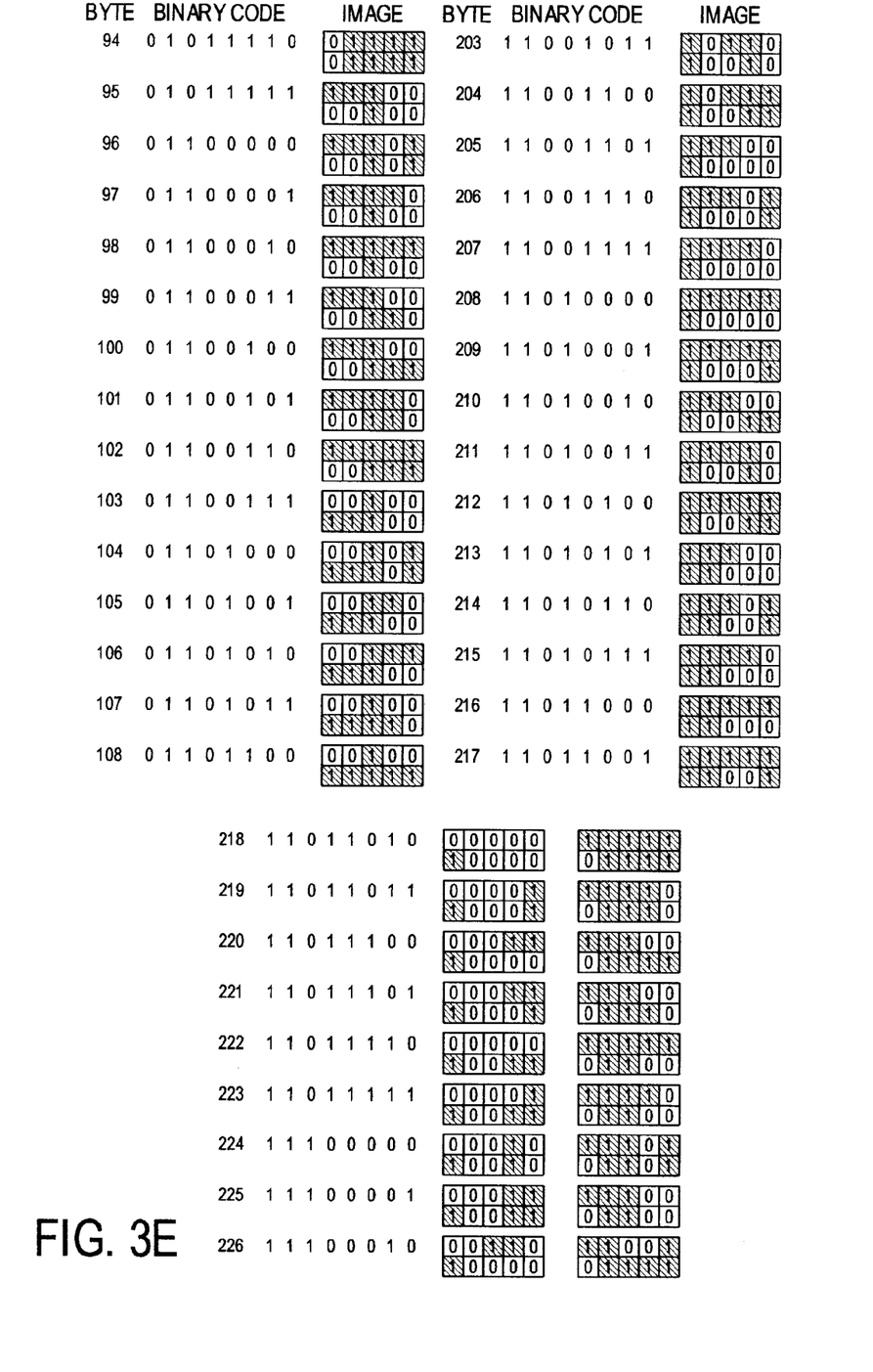
Figure 3F:
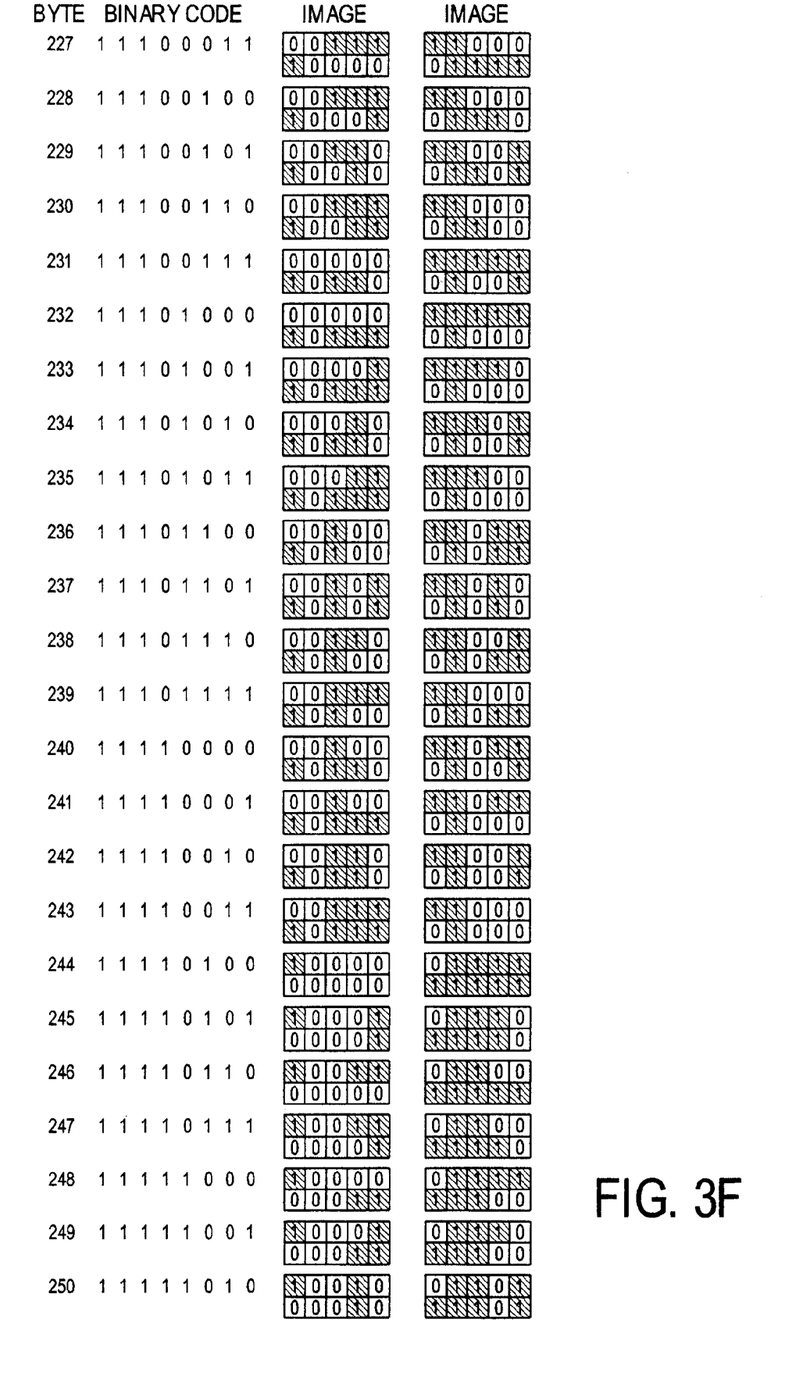
Figure 3G:
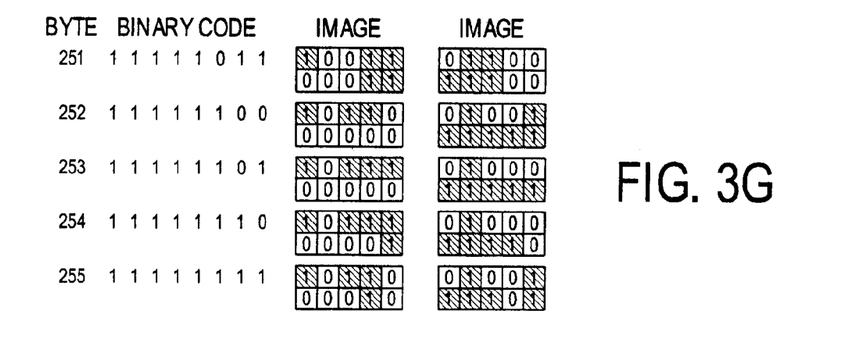

FIG. 2 is a schematic illustration of the geometry of two-dimensional spatial distribution of information pits as four adjacent bytes 20, which are ETT-coded on the surface of, for example, fluorescent data carrier. Here, in compliance with the proposed invention, one data byte is written in field (microregion) 21 consisting of ten (2×5) square elements (hereinafter conventionally called as a "(2×5)-field") having a certain size, wherein each of said square elements contains or does not contain any changes (different from the layer regions carrying no information) in optical properties (factors of absorption, reflection, refraction, birefringence, etc.) testifying the absence or presence of the information pit therein.

Without loosing generality of the proposed invention, hereinafter the multilayer fluorescent data carrier is exemplified by a ROM optical card wherein the fact of the presence or absence of fluorescence in a given square element is used as said optical changes.

For example, depending on the information written, each of said square elements could be either filled, as element 22, or not filled, as element 23, with a substance fluorescing at absorption of reading radiation. Thus, an information byte occupies an area of 10 S, where S=a×a is the area of one square element and a is the side of the square. Adjacent bytes are located on the plane close to each other, with no gaps, in the manner as shown in FIG. 2.

All 256 combinations composing an information byte are represented on the information layer plane by fields of (2×5) square elements of two types. The first 222 combinations are represented by fields characterized by such property that each square element 22 filled with a fluorescent substance (information pit (fluorescent mark)) has inside its "(2×5)-field" at least one identical adjacent element positioned transversely or lengthwise while each square element 23 free of fluorescent substance has inside the field identical adjacent element. Two top and left bottom bytes in FIG. 2 satisfy this condition hereinafter referred to as parity condition.

The remaining combinations are represented each by one of two complementary fields wherein the parity condition can be violated only with regard to either left top or left bottom square element of the "(2×5)-field" (right bottom byte in FIG. 2). Totally, there are 52 such pairs of fields reserved for using as C&D combinations in excess of 256 ones needed to compose an information byte. At data recording, from the pair of fields one is chosen such that when joined to the left field therefrom it ensures satisfaction of the parity condition inside each longitudinal strip consisting of fields (bytes) joined one to another. Consequently, a minimal region filled with a fluorescent substance (or any other material having changes in optical properties other than ones inherent in regions carrying no information) consists of two adjacent fluorescent elements (information pits (fluorescent marks)) and thus has size a×2a. The layer's minimal region free of information pits has the same size. FIG. 3 presents a conversion table for binary and ETT codes.

Using the proposed ETT method of two-dimensional data encoding, information fills in a gap-free manner virtually the entire area of information layers with fluorescent marks (information pits) thus providing an opportunity to use parallel reading techniques by means of one- or two-dimensional photodetector array, for instance a Charge-Coupled Device (CCD)-camera array.

In this case, identification of fluorescent and non-fluorescent square elements in each information layer of the multilayer fluorescent carrier, for instance fluorescent card, takes place layer by layer as it moves under the Linear CCD array (or vice versa, as the Linear CCD array moves along the card) lengthwise (and transversely, if necessary) at a rate timed with both the magnitude of the channel bit and the operating frame rate of the photodetector array. In so doing, pairs of adjacent elements of each transverse column (the bottom element of the top strip and the top element of the bottom strip in FIG. 2) are identified simultaneously.

Both elements are considered information-carrying pits when the signals arrived from individual pixels of the CCD camera covering respective square elements of the fluorescent information layer exceed some level $L_1$. When both signals do not exceed some level $L_2<L_1$, then both elements are not pits. When the above-mentioned terms are not met, the square element with a higher signal level is identified as an information pit, while the element with a lower signal level is not an information pit. The $L_1$ and $L_2$ magnitudes are preset a priori. They depend on the channel bit length, correlation between the information pit (fluorescent mark) size and the CCD camera's elementary pixel size, reader wavelength, numerical aperture of the lens and magnification factor thereof. For a given reading device, they can be assumed as known.

Assume that $I_p$ and $I_n$ are fluorescent signals in locations where an information pit is present or absent, respectively. It has been proved that identification accuracy $C=(I_p-L_1)=(L_2-I_n)$ for the ETT method of two-dimensional data encoding exceeds the respective value for DVD systems in a broad range of changes in reader parameters and consequently the reading error probability for ETT-coded information read by the CCD camera is lower than that for information read from a DVD disc.

Figure 4:
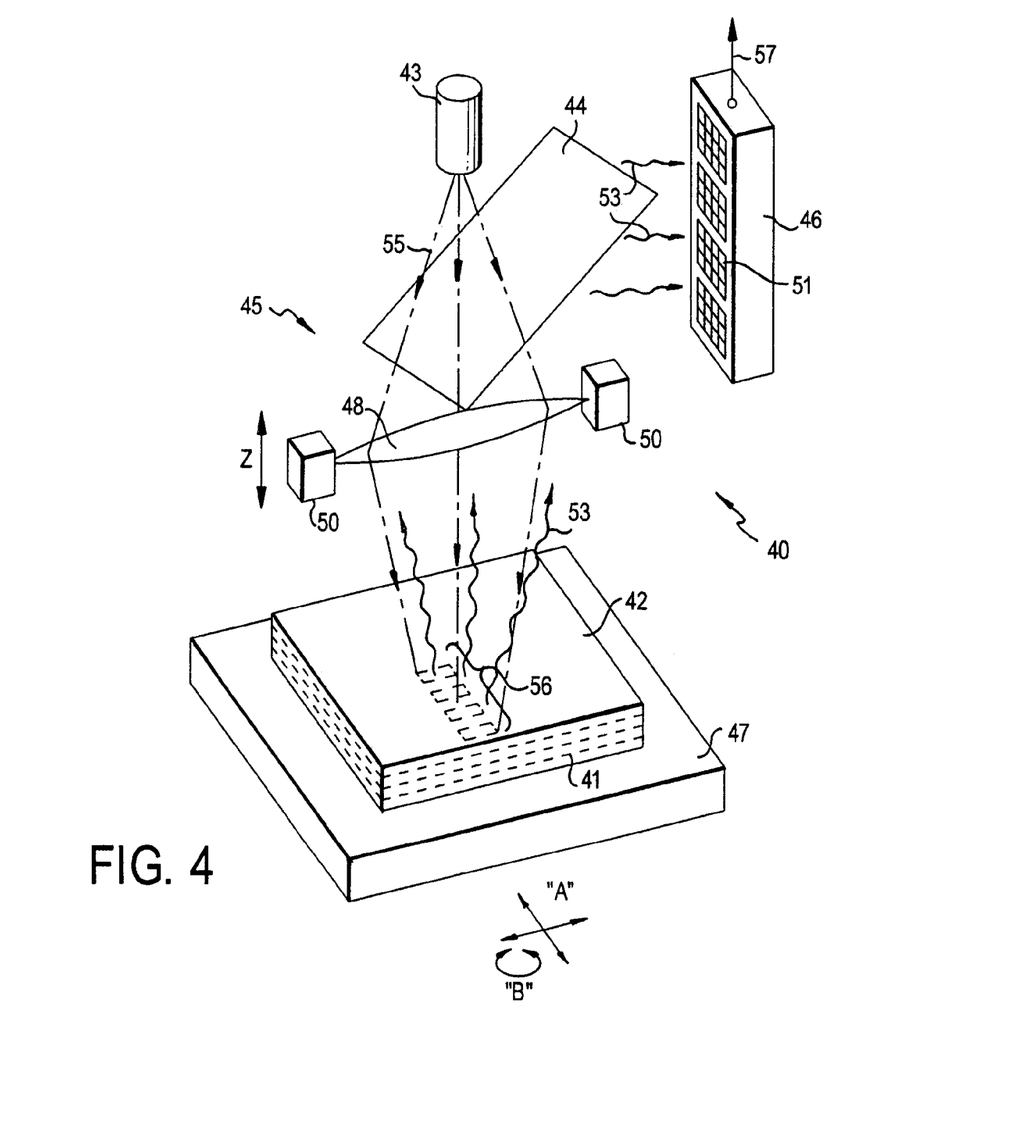
FIG. 4 is a schematic presentation of an embodiment of the optical pickup for parallel reading of information generated by the ETT method of two-dimensional spatial encoding in a fluorescent multilayer optical card.

FIG. 4 schematically presents one of the embodiments of proposed optical pickup for reading data generated using the ETT method of two-dimensional encoding in the fluorescent carrier made as a multilayer optical card.

Optical pickup 40 is designated for reading data stored in one of information layers 41 of fluorescent carrier 42. Said optical pickup comprises source of reading radiation 43 with such a wavelength that it excites information pit fluorescence, dichroic mirror 44, transmitting reading radiation 55 and reflecting fluorescent (information-carrying) radiation 53, optical system 45 shaping requisite spatial configuration 56 of reading beam 55 in the location of a given information layer and fluorescent image thereof in the plane of location of one- or two-dimensional photodetector array 46. Constructionally, reading involves movement of the reading head comprising items 43, 44, 45 and 46, and fluorescent optical card 42 relative to each other. On the layout in FIG. 4 the reading head is immobile while the optical card is by means of device 47 set to linear motion relative to said reading head lengthwise and transversely (directions "A") and rotationally (direction "B") for their angular positioning relative to each other.

As a source of reading radiation 43, there can be used either one CW diode laser or a matrix of light-emitting diodes (LED) (organic or solid-state) or a matrix of vertical cavity surface emitting lasers (VCSEL) integrated with microelectronic circuitry controlled by computer as well as controllable transparency, etc.

As photodetector matrix 46, there can be used a multitude of photodiodes, phototransistors and other photosensitive elements. The most preferable are Charge-Coupled Devices (CCD cameras) 51.

Optical system 45 incorporates at least linear array 48 of microlenses 49 and servo mechanism 50 enabling focusing error check and autotracking as well as microlens linear array movement along axis Z within 1–3 mm for reading data from given fluorescent layer 41 of multilayer carrier 42.

In addition, said optical system enables operation of the reading head in the controllable magnification mode. The number of microlenses 49 can be equal to the number of CCD cameras 51 in photoreceiver linear array 46.

Figure 5:
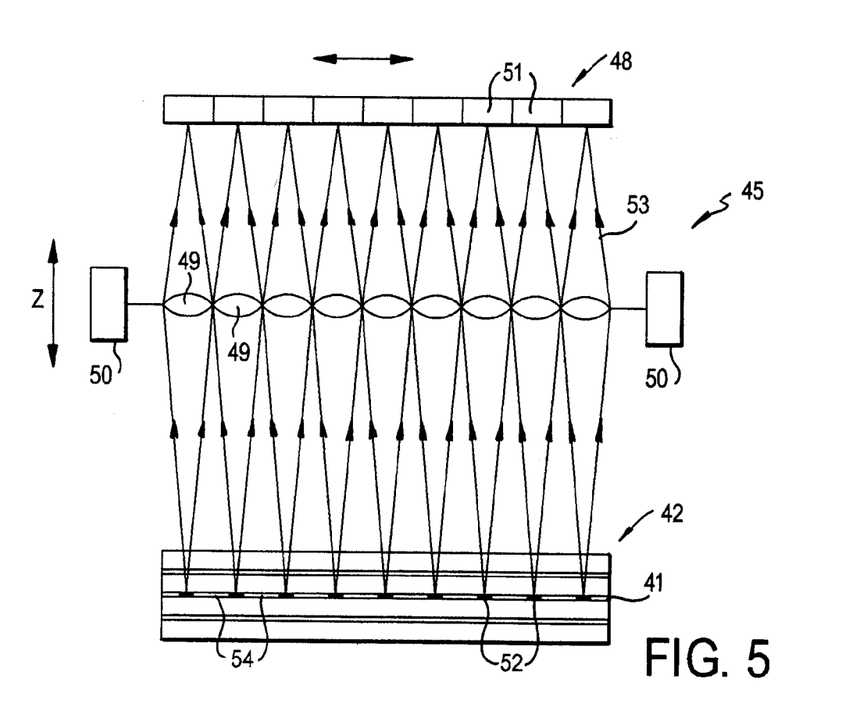
FIG. 5 is a schematic presentation of optical communication among elements of the information layers of the optical card and the CCD-camera array.
Figure 6:
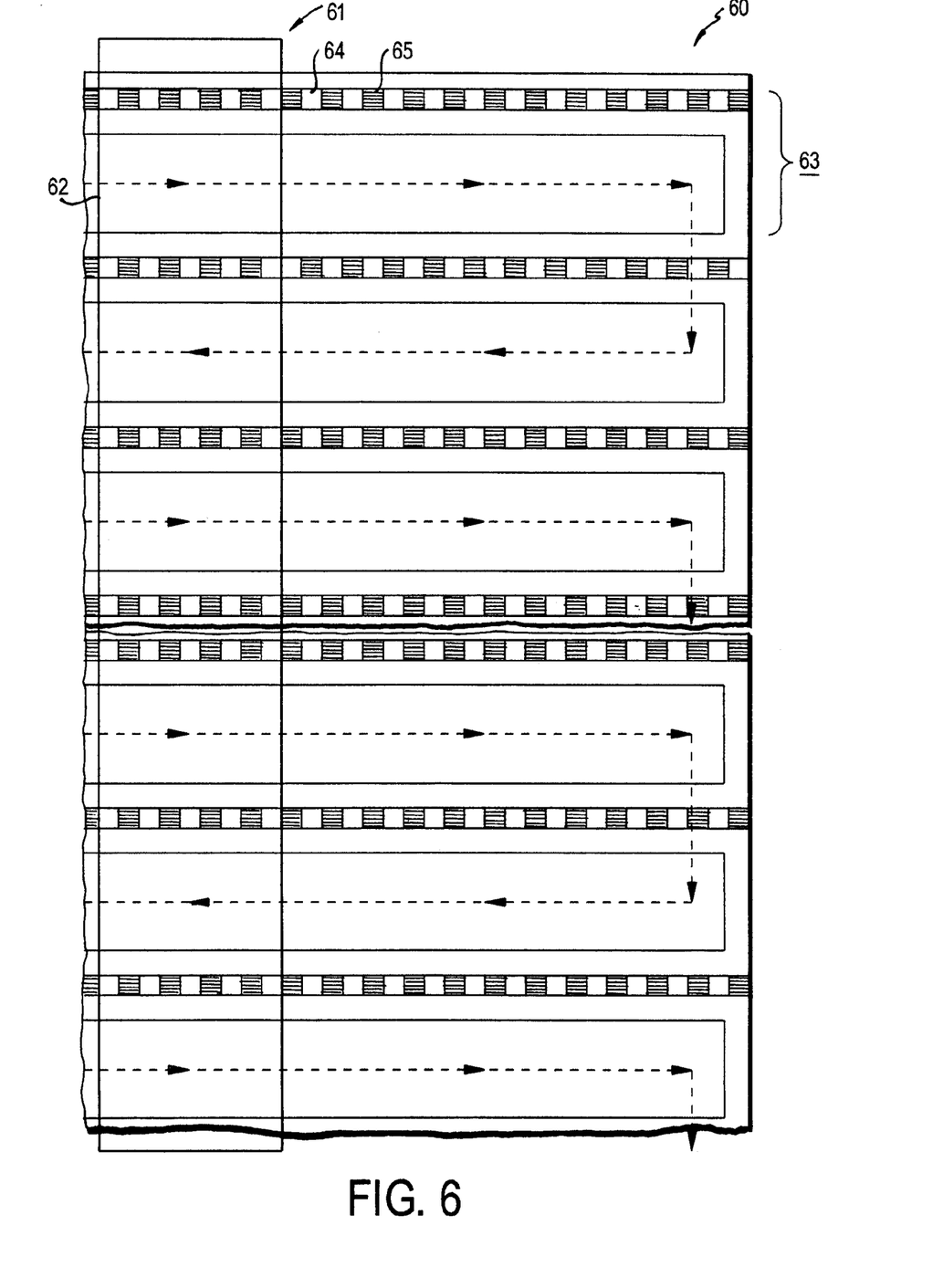
FIG. 6 schematically illustrates the movements of the CCD-camera array and the fluorescent optical card relative to each other.

As can be seen from FIGS. 4 and 5, on reading linear array 48 of microlenses 49 irradiates only certain parts 52 of information layer 41. Images of information pits in these parts are transferred to certain scale onto the plane of linear array 46 of CCD cameras 51 by means of fluorescent radiation 53 excited by reading radiation source 43 using microlenses 49. To read the remaining within the linear array part 54 of information pits, the carrier or the reading head move transversely relative to each other, as shown by an arrow in FIG. 5 and more clearly in FIG. 6 (view from top).

Card 60 can have width H equal to the length of linear array 61 of CCD cameras 62. The length of card 60 may be arbitrary. Each information layer of the card consists of N information strips of width h. Each strip 63 is equipped with special C&D ("control and display") track 64 with periodically written thereon information pits 65 enabling timing and autotracking of linear array 61 of CCD cameras 62 as it moves relative to card 60. A diagram of continuous joint movement of the first two CCD cameras of the linear array along and across optical card 60 is shown by dotted line in FIG. 6. The synchronous movement of all other CCD cameras of linear array 61 takes place in a similar way.

The device schematically presented in FIG. 4 operates as follows. Upon transmission through dichroic mirror 44, reading radiation beam 55 is focused by means of optical system 45 in the plane of information-carrying layer 41 subjected to reading as intensity-uniform spatial configuration 56 matching the configuration of photodetector linear array 46 constructed to certain scale. Fluorescent radiation 53 induced by reading radiation 55 from source 43 is collected by that same optical system 45 and upon reflection from dichroic mirror 44 is presented to certain scale in the plane of photodetector linear array 46. Electric signals 57 arriving from the photodetector linear array, following their identification as described above, are converted to data and sent to a customer while control and display information signals are utilized to ensure normal operation of servo mechanism 50, actuator 47 and power control unit for reading radiation source 43.

The advantages of the proposed encoding method can be exemplified as follows.

When using the proposed in the present invention ETT method of two-dimensional data encoding for fabrication of a multilayer fluorescent optical pickup wherein'the recording density in each information layer is equal to the recording density in DVD RON systems, the fluorescent information carrier should have the following parameters:

| | |
|---|---|
| Size of square element filled with fluorescent substance (or not filled) | $S = 0.4\ \mu m \times 0.4\ \mu m$ |
| Size of minimal region filled with fluorescent substance (or not filled) | $0.4\ \mu m \times 0.8\ \mu m$ |
| Size of information byte | $1.6\ \mu m^2$ |
| Size of channel bit | $0.4\ \mu m$ |

This means that for above parameters the proposed ETT method of two-dimensional data encoding on fluorescent carriers enables writing density 60 MB/cm$^2$, which is characteristic of DVD systems.

Let us assume that one information layer of the optical card has width 10 cm equal to the length of a linear array of 10 CCD cameras. If the layer length is 10 cm, said layer contains approximately 6 GB of information (or approximately 60 GB of information in 10 layers). Each layer consists of 250 information strips 400 $\mu$m wide and 10 cm long. Each CCD camera has 1000×1000 pixels and is capable of comparing the signal from each pixel with two levels and the signals from adjacent pixels between each other. If a CCD-camera pixel is equal to 8 $\mu$m, the approximate size of each camera is 1 cm×1 cm and that of the whole linear array 10 cm×1 cm. With a 20-fold magnification, the camera pixel size coincides with the magnified pit size. In this case, if the camera generates 30 frames per second, the whole linear array can read at the rate of $3 \cdot 10^8$ pit/s which in terms of the ETT code is $30 \cdot 10^6$ B/s, or approximately 220 Mb/s.

The rate of the linear CCD array movement above the optical card (or vice versa) is found from the assumption that the way of 400 $\mu$m (the field accepted by one camera as data pit-to-CCD pixel) covered within the time interval between two consecutive frames is 1/30s. Thus, the movement rate is approximately 12 mm/s, which is about 10 times less than the rate of one-time data reading from a CD optical disc.

A possible embodiment is when a CCD camera pixel is 4 $\mu$m, i.e. one information pit is read in 4 pixels of the CCD camera (to be more exact, ¼ of pit is read in one pixel). In this case, the reading rate slows down 4 times making approximately 55 Mb/s but the reading accuracy significantly improves resulting in a considerably reduced reading error probability.

Figure 7:
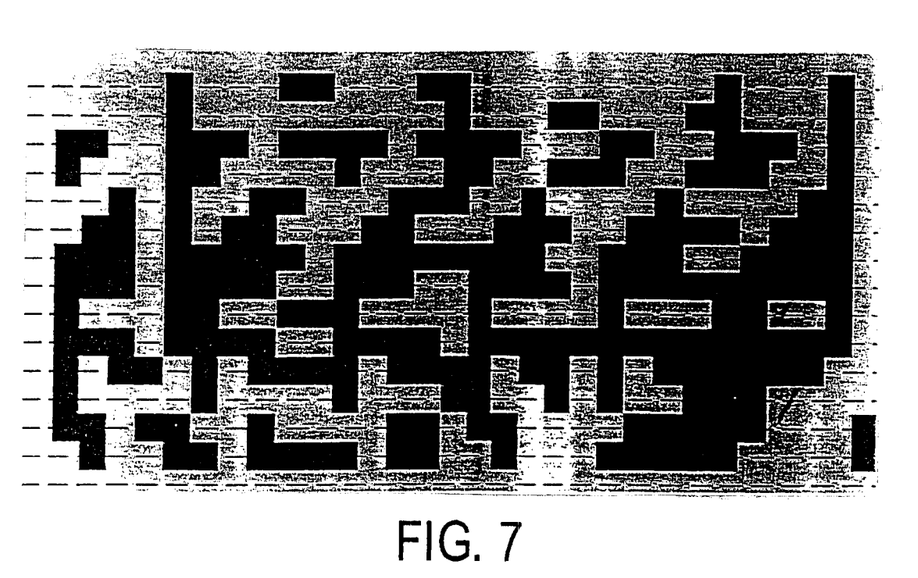
FIG. 7 is the original computer image of an ETT-coded fluorescent optical card fragment for λ=0.65 μm and NA=0.65 that can be used as a photomask for fabrication of one of the information layers in a CD ROM multilayer fluorescent optical disc.
Figure 8:
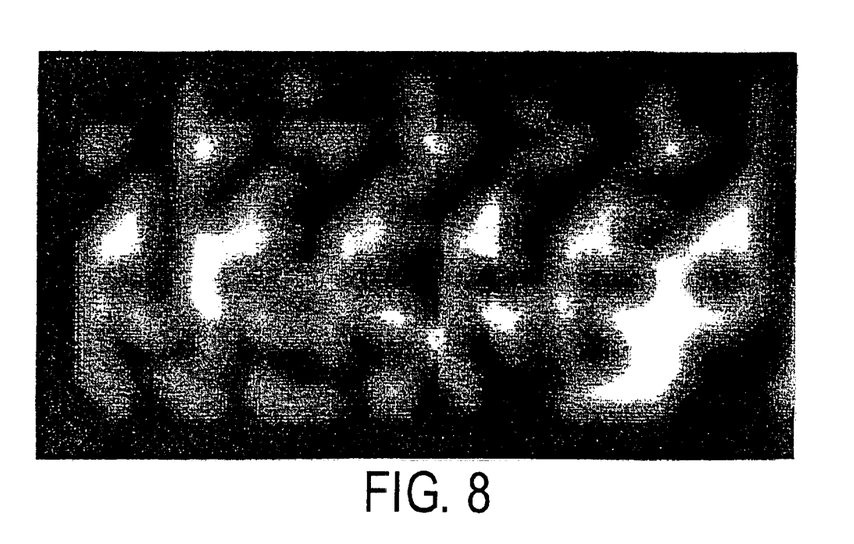
FIG. 8 is a computer image of that same fragment of the fluorescent card generated by the reading optical system in the plane of the CCD-camera array.
Figure 9:
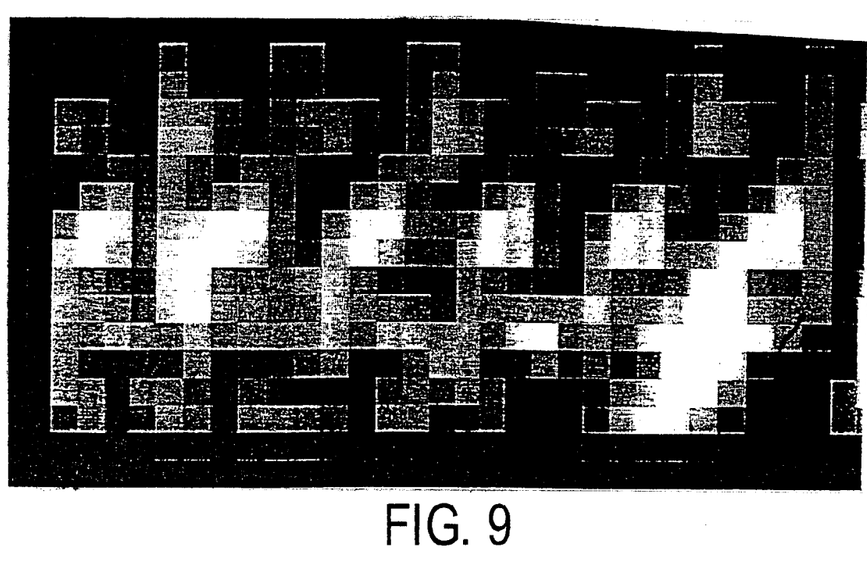
FIG. 9 is a picture of that same fragment of the fluorescent card that has been read by a CCD camera.

FIGS. 7–9 show the original computer image of an ETT-coded fragment of the fluorescent optical card at $\lambda$=0.65 $\mu$m and NA=0.65 (FIG. 7), computer image of that same fragment generated by the optical system of the reading device in the plane of the linear CCD array (FIG. 8) and the real image of the same fragment read by the CCD camera. Subsequent processing of the latter image allows reproduction of the original image of said fragment with probability of 1.

Consequently, the proposed ETT-method of two-dimensional encoding of data on fluorescent carriers enables the same recording density as the EFM-encoding techniques used in DVD memory systems (see Table 1). In addition, the ETT-encoding method ensures provides fluorescent memory systems with other advantages:

1. The size of the minimal region filled with a fluorescent substance comparable with the size of the CD-format pit (and twice as big as the size of the minimal information pit of the DVD-format) facilitates the process for manufacturing a multilayer fluorescent information carrier and enables a higher fluorescent signal on reading thus facilitating operation of the reader;
2. The size of the ETT channel bit more than the CD one by a factor of 1.5 (and three-fold larger than that of the DVD format) allows a significant reduction in the frequency band and accordingly the reader photoreceiver noise;
3. Virtually 100% filling of the information layer area with fluorescent marks (information pits) permits application of parallel reading methods and enables an increase in the reading rate by tens of times in comparison with the DVD systems;
4. For equal wavelengths of the reading radiation and the objective lens used, a considerably lower reading error probability is enabled in contrast to the CD and DVD optical data carriers.

The proposed ETT ("eight-to-ten") method of two-dimensional data encoding can be used not only in one- or multilayer fluorescent information carriers but also in carriers based on other physical and chemical principles, such as photorefractive crystals, photopolymers, magnetooptical, phase-change and persistent spectral-hole-burning recording systems, as well as in a number of other two- and three-dimensional carriers of ROM-, WORM- and WER- type.

It is to be noted that in the proposed invention the fluorescent information carrier has been discussed as an optical card allowing a simplest possible realization of the design of an optical pickup with parallel data reading. However, with some technological changes in the reading device, the proposed encoding method is applicable to other forms of optical memory, for example, such as an optical disc, optical memory plate, optical memory tape, or optical memory drum (cylinder), etc.

With appropriate modification, said method can be also used for three-dimensional volumetric data encoding as volumetric bytes recorded within a specified microvolume using the two-photon procedure, each said byte consisting of N number of cubic elements of certain size. Data can be read by means of either one- or two-photon procedure.

What is claimed is:

1. A method for data reading/writing using an optical carrier comprising the following stages:

production of an optical data carrier as a two- or three-dimensional optical medium having at least one or many information carrying layers with surfaces of said layers containing recorded information;

generation on said surfaces of said layers of a multitude of optically readable numerical data (information pits) encoded in such a way that on each said surface one data byte is written in a field (microregion) consisting of ten (2×5) square elements ("(2×5)-field") of definite size, wherein each of said square elements contains or not changes (different from the surface areas carrying no information) in optical properties (absorption, reflection and fluorescence factors, refraction index, birefringence factor, etc.) testifying either the presence or absence of information pits therein, with one data byte occupying on said surface an area of 10S, where S=a×a is the area of one square element, a is the square side, and where adjacent bytes are positioned on the surface of information layers close to each other in a gap-free manner, with total 256 combinations forming one data byte represented on the surface of an information layer by "(2×5)-fields" of two types, with the first 222 combinations represented by fields wherein each information carrying square element (pit) has inside the "(2×5)-field" at least one identical adjacent element across or lengthwise, while each square element contaning no information pit has inside the field an identical adjacent element (parity condition) and at data recording that particular "(2×5)-field" is selected from the pair of "(2×5)-fields" which, when butted to the leftside field therefrom, enables the parity condition inside each longitudinal strip consisting of butted to each other fields (bytes);

simultaneous (parallel) data reading from a designated information layer of the optical carrier using a source of electromagnetic radiation with a wavelength suitable for optical reading of data stored in the information carrier as local changes in optical properties of information layers and the optical system enabling simultaneous (parallel) reading of data as a multitude of information pits through generating a requisite, uniform in terms of intensity spatial configuration of the reading electromagnetic radiation in the site of the designated information layer and image by means of read-off radiation of this spatially intensity-modulated configuration to a specified scale in the plane of a matrix photoreceiver while keeping said photoreceiver intact of the reading radiation;

conversion of the space-modulated pattern of the read-off radiation in the plane of said photoreceiver to output electric signals and indetification of said signals, with simultaneous indentification of pairs of adjacent square elements of each transverse column of the "(2×5)-field" while reading, and in so doing both elements are considered to be information carrying pits when the signals received from individual photodetectors "covering" respective square elements of the information layer exceed a certain level $L_1$ and not considered to be information carrying pits when both said signals do not exceed a certain level $L_2<L_1$, while whenever the above-mentioned conditions are not met, the square element with a larger signal level is considered to be the information pit and the other element accordingly is not considered to be the information carrying pit.

2. The method according to claim 1, where the minimal regions of the information layer containing any changes (absorption, reflection or fluorescence factors, refraction or birefringence indices, etc.) are composed of two identical adjacent square elements (i.e. information pits) and consequently measure a×2a.

3. The method according to claim 1, where minimal regions of the information layer free of information pits measure a×2a.

4. The method according to claim 1, where for writing of control and display information, part of 52 combinations is used, each represented by one of two complementary "(2×5)-fields" wherein the parity condition can be violated only either for the top left or bottom left square element of the field consisting of a "(2×5)-field".

5. The method according to claim 1 where media based on various physical and chemical principles, such as photorefractive crystals and polymers, photopolymers, magnetooptical, phase-change, persistent spectral-hole-burning recording systems of ROM-, WORM- or WER-type, etc. are used as a recording medium for optical data carriers.

6. The method according to claim 5, where the optical data carriers can be made as one- or multilayer optical discs or cards, optical memory plates, optical memory tapes or optical memory drums (cylinders) etc.

7. The method according to claim 1, where the optical data carrier can be a three-dimensional volumetric carrier with two-photon data recording and one- or two-photon data reading with data encoding as volumetric bytes written in specified microvolume and consisting of N cubic elements of certain size.

8. A device for reproducing of data stored in said optical carrier including:

a two- or three-dimensional optical data carrier having at least one or many information carrying layers containing a multitude of optically readable numerical data (information pits) encoded in such a way that one data byte is written in a field (microregion) consisting of ten (2×5) square elements ("(2×5)-field") of definite size, wherein each of said square elements contains or does not contain changes (different from the layer areas carrying no information) in optical properties (absorption and reflection factors, refraction index, birefringence factor, etc.) testifying either the presence or absence of an information pit therein, with one data byte occupying an area of 10S, where S=a×a is the area of one square element and a is the square side;

a source of electromagnetic radiation with a wavelength suitable for optical reading of data stored in the information carrier as local changes in optical properties of information layers;

an optical system enabling simultaneous (parallel) reading of data as a multitude of information pits through generating a requisite, uniform in terms of intensity spatial configuration of the reading electromagnetic radiation in the site of the designated information layer and image by means of read-off radiation of this spatially intensity-modulated configuration to a specified scale in the plane of the matrix photoreceiver while keeping said photoreceiver intact of the reading radiation;

a photoreceiver including one- or two-dimensional photoreceiver array enabling simultaneous (parallel) detection of the read-off information-carrying radiation as spatially intensity-modulated one- or two-dimensional pattern of information pits and conversion thereof to information-carrying electric signals;

a device enabling an error check for focusing and autotracking as well as movement of said optical system for reading data from the designated information layer;

a device enabling relative lengthwise and transverse movement and angular adjustment of the data carrier and reader relative to each other.

9. The device according to claim 8 where adjacent bytes are located on the surface of information layers of the data carrier close to each other without any gaps.

10. The device according to claim 8 where all 256 combinations representing a data byte are represented on the information layer plane by two types of "(2×5)-fields", with the first 222 combinations represented by fields wherein each information-carrying square element (pit) has inside its "(2×5)-field" at least one identical adjacent element in longitudinal or transverse direction while each square element containing no information pit has inside its field identical adjacent element (parity condition).

11. The device according to claim 8 where control and display information is formed by using part of 52 combinations represented by one of two mutually complementary "(2×5)-fields" each wherein the parity condition can be violated only for the top left or bottom left square element of the field consisting of (2×5) square elements.

12. The device according to claim 8 where simultaneous (parallel) data reading from the optical carrier is realized by means of mutual lengthwise (and, if necessary, transverse) movement of the data carrier and reader relative to each other at a rate synchronized with both the size of the channel bit of the optical data carrier and frame operation frequency of the photodetector array.

13. The device according to claim 8 where on reading, pairs of adjacent square elements of each transverse column of the "(2×5)-field" are identified simultaneously.

14. The device according to claim 8 where both said elements are considered information-carrying pits when the signals arrived from individual photodetectors "covering" respective square elements of the information layer exceed some level $L_1$ and are not considered information-carrying pits when both signals do not exceed certain level $L_2<L_1$. When the above-mentioned conditions are not met, the square element with a higher signal level is identified as an information pit, while the other element, accordingly, is not considered an information pit.

15. The device according to claim 8 where $L_1$ and $L_2$ magnitudes are preset by the technical parameters of both the optical data carrier and the reader.

16. The device according to claim 8 where a fluorescent multilayer data carrier is used as said optical data carrier.

17. The device according to claims 8 and 16 where a fluorescent multilayer optical card is used as said fluorescent multilayer data carrier.

18. The device according to claim 17 wherein the fluorescent multilayer optical card has 10 information layers of size 10 cm×10 cm and capacity of approximately 6 GB each (or 60 GB in the card), with each layer comprising 250 information strips 400 µm wide supplied with tracks for C&D (control and display) information.

19. The device according to claims 8 and 16 where as an optical property characterizing the presence or absence of an information-carrying pit in this or that square element of the information layer, the presence or absence of fluorescence therein is used.

20. The device according to claims 8 and 16 where to ensure writing density of 60 MB per square centimeter, the information layer of the fluorescent optical card should have the following parameters:

| | |
|---|---|
| Size of square element filled with fluorescent substance (or not filled) | S = 0.4 µm × 0.4 µm |
| Size of minimal region filled with fluorescent substance (or not filled) | 0.4 µm × 0.8 µm |
| Size of information byte | 1.6 µm² |
| Size of channel bit | 0.4 µm |

21. The device according to claim 8 where the fluorescent multilayer optical card has 10 information layers of size 10 cm×10 cm and capacity of approximately 6 GB each (or 60 GB in the card), with each layer consisting of 250 information strips 400 µm wide supplied with tracks for C&D (control and display) information allowing timing and autotracking of the photoreceiver while said photoreceiver is moving across and along the optical card.

22. The device according to claim 21 where as a photoreceiver a linear array of CCD cameras is used; each said CCD camera has 1000×1000 pixels of size 8 µm and is capable of comparing a signal from each pixel with two levels and signals from adjacent pixels between themselves.

23. The device according to claim 8 where as a photoreceiver a linear array of CCD cameras is used; each said CCD camera has 1000×1000 pixels of size 8 µm and is capable of comparing a signal from each pixel with two levels and signals from adjacent pixels between themselves.

24. The device according to claim 23 where the CCD camera operates in the "data pit-to-CDD pixel" mode at 30 frames per second and reading rate $3–10^8$ pits which corresponds to $30–10^6$ B/s or approximately 220 Mb/s.

25. The device according to claim 23 where the CCD camera operates in the "one data pit-to four pixels" mode (1 pit is read in 4 CCD pixels).

26. The device according to claim 8 where the CCD camera operates in the "data pit-to-CCD pixel" mode at 30 frames per second and reading rate $3·10^8$ pit/s which corresponds to $30·10^6$ B/s or approximately 220 Mb/s.

27. The device according to claim 8 where the CCD camera operates in the "one data pit-to-four pixels" mode (1 pit is read in 4 CCD pixels).

* * * * *